(12) United States Patent
Stearns et al.

(10) Patent No.: US 8,268,468 B2
(45) Date of Patent: *Sep. 18, 2012

(54) BATTERY CAN HAVING OFF-CENTER VENT

(75) Inventors: John C. Stearns, Medina, OH (US);
Robert E. Ray, Strongsville, OH (US);
Richard L Bouffard, Litchfield, CT
(US); Walter B Ebner, Terryville, CT
(US); John O'Halloran, Cheshire, CT
(US); R. Justin Begg, Brunswick, OH
(US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/007,745

(22) Filed: Jan. 17, 2011

(65) Prior Publication Data

US 2011/0111271 A1 May 12, 2011

Related U.S. Application Data

(63) Continuation of application No. 11/439,758, filed on May 24, 2006, now Pat. No. 7,875,376.

(51) Int. Cl.
*H01M 2/12* (2006.01)
*B65D 51/16* (2006.01)
(52) U.S. Cl. ................... 429/56; 220/203.01
(58) Field of Classification Search ............ 429/56, 429/82, 53, 55; 220/203.01, 203.08
See application file for complete search history.

(56) References Cited

U.S. PATENT DOCUMENTS

| | | |
|---|---|---|
| 2,525,436 A | 10/1950 | Williams, Jr. |
| 3,815,534 A | 6/1974 | Kneusel |
| 3,826,412 A | 7/1974 | Kneusel |
| 3,909,303 A | 9/1975 | Rosansky et al. |
| 4,256,812 A | 3/1981 | Tamura et al. |
| 4,698,282 A | 10/1987 | Mantello |

(Continued)

FOREIGN PATENT DOCUMENTS

CH 574350 A 4/1976

(Continued)

OTHER PUBLICATIONS

Patent Cooperation Treaty (PCT), International Search Report and Written Opinion for Application No. PCT/US2007/012381, filed May 23, 2007, mailed Feb. 13, 2008, European Patent Office, Netherlands.

*Primary Examiner* — Ula C. Ruddock
*Assistant Examiner* — Thomas H. Parsons
(74) *Attorney, Agent, or Firm* — Michael C. Pophal

(57) ABSTRACT

An electrochemical cell is provided with an enhanced pressure relief vent formed in a closed end of the cell container that allows for effective venting of gas from the closed end of the container. The cell includes a container having a first end, a second end, a side wall extending between the first and second ends, and an end wall extending across the first end. The cell has a positive electrode, a negative electrode, and an aqueous alkaline electrolyte, all disposed in the container. The cell further includes a pressure relief vent mechanism having an offset C-shaped reduced thickness groove formed in the end wall of the container. A cover can be welded to the closed end wall of the container over the pressure relief vent mechanism.

20 Claims, 3 Drawing Sheets

U.S. PATENT DOCUMENTS

| | | |
|---|---|---|
| 4,803,136 A | 2/1989 | Bowsky et al. |
| 4,842,965 A | 6/1989 | Urushiwara et al. |
| 5,340,666 A * | 8/1994 | Tomantschger et al. ........ 429/59 |
| 5,677,076 A | 10/1997 | Sato et al. |
| 6,159,631 A | 12/2000 | Thompson et al. |
| 6,346,342 B1 | 2/2002 | Li |
| 6,348,281 B1 | 2/2002 | Li |
| 6,423,440 B1 | 7/2002 | Takada et al. |
| 6,620,543 B2 | 9/2003 | Li |
| 6,632,558 B1 | 10/2003 | Sondecker et al. |
| 2004/0157115 A1 | 8/2004 | Bouffard et al. |

FOREIGN PATENT DOCUMENTS

| | | |
|---|---|---|
| FR | 2579833 A | 10/1986 |
| FR | 2579833 A1 | 10/1986 |
| FR | 2627327 A1 | 8/1989 |
| GB | 2334812 A | 9/1999 |
| JP | 59154743 A | 9/1984 |
| JP | 2284350 Y | 11/1990 |
| JP | 4215245 Y | 8/1992 |
| JP | 9161738 Y | 6/1997 |
| JP | 10284035 A | 10/1998 |
| JP | 11213978 A | 8/1999 |
| JP | 2002251987 A | 9/2002 |
| WO | 0137355 A | 5/2001 |

* cited by examiner

BATTERY CAN HAVING OFF-CENTER VENT

RELATED APPLICATIONS

This application is a continuation of U.S. application Ser. No. 11/439,758, U.S. Pat. No. 7,875,376.

BACKGROUND OF THE INVENTION

The present invention generally relates to electrochemical cells (batteries) and, more particularly, relates to an alkaline electrochemical cell having a pressure relief vent formed in the cell container for effectively venting gases at excessive pressure.

Alkaline electrochemical cells employ a container typically in the form of a cylindrical steel can having a closed bottom end, an open top end, and a cylindrical side wall extending between the top and bottom ends. Contained within the can is a positive electrode, also referred to as the cathode, which typically comprises manganese dioxide. Also contained within the can is a negative electrode, also referred to as the anode, which typically comprises zinc. In bobbin-type cell constructions, the cathode may be ring molded or impact molded against the interior surface of the steel can, while the anode is generally centrally disposed within the can. A separator is located between the anode and the cathode, and an alkaline electrolyte solution contacts the anode, cathode and separator. A conductive current collector is inserted into the anode active material. A collector and seal assembly, which typically includes an annular polymeric seal, an inner metal cover, the current collector, and an outer cover, provides closure to the open top end of the steel can to seal closed the steel can.

Conventional alkaline electrochemical cells are commonly sealed closed by placing the collector and seal assembly with the annular polymeric (e.g., nylon) seal in the open end of the steel can and crimping the upper end of the can radially inward and over the outer periphery of the seal to compress the seal against the can. The electrochemically active materials, such as zinc, may generate hydrogen gas and other gases. With the can sealed closed, excessive build-up of high pressure gases within the sealed can may lead to damage to the cell and/or the device in which the cell is employed. Thus, it is desirable to provide a controlled vent mechanism that vents highly pressurized gases from within the can to prevent the pressurized gases from reaching excessive levels that may cause the can to uncrimp and release excessive electrolyte solution and particulate matter.

A common approach to venting excessive pressurized gases from within an electrochemical cell includes the use of a vent formed in the annular polymeric seal of the collector and seal assembly, which is intended to rupture upon experiencing excessive pressure within the sealed volume of the cell. One example of a vent formed as a thin portion in an annular polymeric seal is disclosed in U.S. Pat. No. 5,667,912, with the vent intended to shear when the pressure exceeds a predetermined pressure limit. The conventional approach of employing a vent in the seal structure requires an assembly that generally consumes a significant amount of useable volume within the battery can. This results in less space available for the electrochemically active materials, thus limiting battery service life capability.

In order to minimize space occupied by the collector and seal assembly, it has been proposed to form the pressure relief vent mechanism in the closed bottom end wall of the metal can, and to cover the vent with the positive contact terminal. Examples of a vent and contact terminal provided on the closed bottom end wall of the battery can are disclosed in U.S. Pat. No. 6,620,543 and U.S. Patent application Publication No. 2004/0157115 A1 (now U.S. Pat. No. 7,195,839), the entire disclosures of which is hereby incorporated herein by reference. According to these approaches, the pressure relief vent, formed as a reduced thickness groove in the bottom end wall of the metal can, is formed in one or two semicircular C-shapes generally centered about the central location of the bottom closed end of the can. When the internal pressure exceeds a predetermined limit (relative to the outside atmospheric pressure), the vent ruptures to release pressure from within the internal volume of the battery can to the outside atmosphere. The previous proposed C-shaped vents may, in some situations, require a thin coined thickness, such as 2.0 mils, to yield an acceptable vent pressure. Such thin vents may be susceptible to damage such as during cell manufacturing (e.g., impact molding), and therefore may be unacceptable for some cells.

Additionally, welded onto the closed bottom end wall of the conventional battery can is the positive contact terminal or cover which includes an outwardly protruding nubbin having an upstanding wall extending from a peripheral flange that is welded to the closed bottom end wall of the can. The peripheral flange is typically spot welded to the steel can via three symmetric welds, spaced apart from each other at equal distances, i.e., sequentially located at angles of 120°. In some proposed batteries, the positive contact terminal is supposed to allow gas to escape between the peripheral flange of the contact terminal and the bottom end wall of the can between adjacent welds. However, due to bulging of the can and resultant flexing of the bottom end wall, and further due to improved low profile walls, and the symmetric spacing of the adjacent welds (e.g., 120°), the peripheral flange of the overlying cover may form a seal against the bottom end wall of the can and prevent proper venting of gas to the outside environment. Thus, proper venting of excessive gases may be inhibited which could lead to a possible crimp release.

Accordingly, it is desirable to provide for an electrochemical cell having an effective vent formed in the battery can. It is further desirable to provide for a battery can that vents excessive gases and properly allows the excessive gases to be effectively released to the outside environment.

SUMMARY OF THE INVENTION

The present invention improves the protective safeguards of an electrochemical cell with an enhanced vent mechanism formed in the closed end wall of the cell container that achieves effective venting of gases from the container. To achieve this and other advantages, in accordance with the purpose of the present invention as embodied and described herein, the present invention provides for an electrochemical cell including a container having a first end, a second end, a side wall extended between the first and second ends, and an end wall extending across the first end. The cell also has a positive electrode, a negative electrode and an alkaline electrolyte disposed in the container. The cell further includes a pressure relief vent mechanism formed in the end metal wall of the container for releasing internal pressure from within the container when the internal pressure becomes excessive. The pressure relief vent mechanism has a reduced thickness groove formed substantially in a C-shape having first and second ends and a curved portion between the first and second ends. Additionally, the groove is offset from the center of the end metal wall such that the curved portion of the C-shaped reduced thickness groove midway between the ends is closer to the center of the end metal wall than the first and second ends.

According to another aspect of the present invention, a metal can is provided having a pressure relief vent mechanism for use as an electrochemical cell container. The metal can includes a side wall, an open end and a closed end having an integral metal end wall. A pressure relief vent mechanism is formed in the metal end wall of the container. The reduced thickness groove is formed substantially in a C-shape having first and second ends and a curved portion extending between the first and second ends. The groove is offset from the center of the metal end wall such that the curved portion of the C-shape is closer to a center of the end wall than the first and second ends. The formation of the C-shaped groove offset from the center of the metal end wall advantageously allows for proper venting of excessive gases for some battery cells, particularly those employing a cover overlying the pressure relief vent mechanism.

According to yet another aspect, the invention provides an electrochemical cell having a container with a first end, a second end, a side wall extending between the first and second ends, and an end metal wall extending across the first end; a positive electrode, a negative electrode and an aqueous alkaline electrolyte disposed in the container; and a pressure relief vent mechanism formed in the end metal wall of the container for releasing internal pressure from within the container when the internal pressure becomes excessive. The pressure relief vent mechanism has a reduced thickness groove formed in a C-shape. The C-shaped groove has two ends and a curved portion between the ends, and the groove is offset from the center of the end metal wall such that the midpoint of the groove, located on the groove midway between the two ends, is closer to the center of the end metal wall than to the radially outermost part of the end metal wall.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
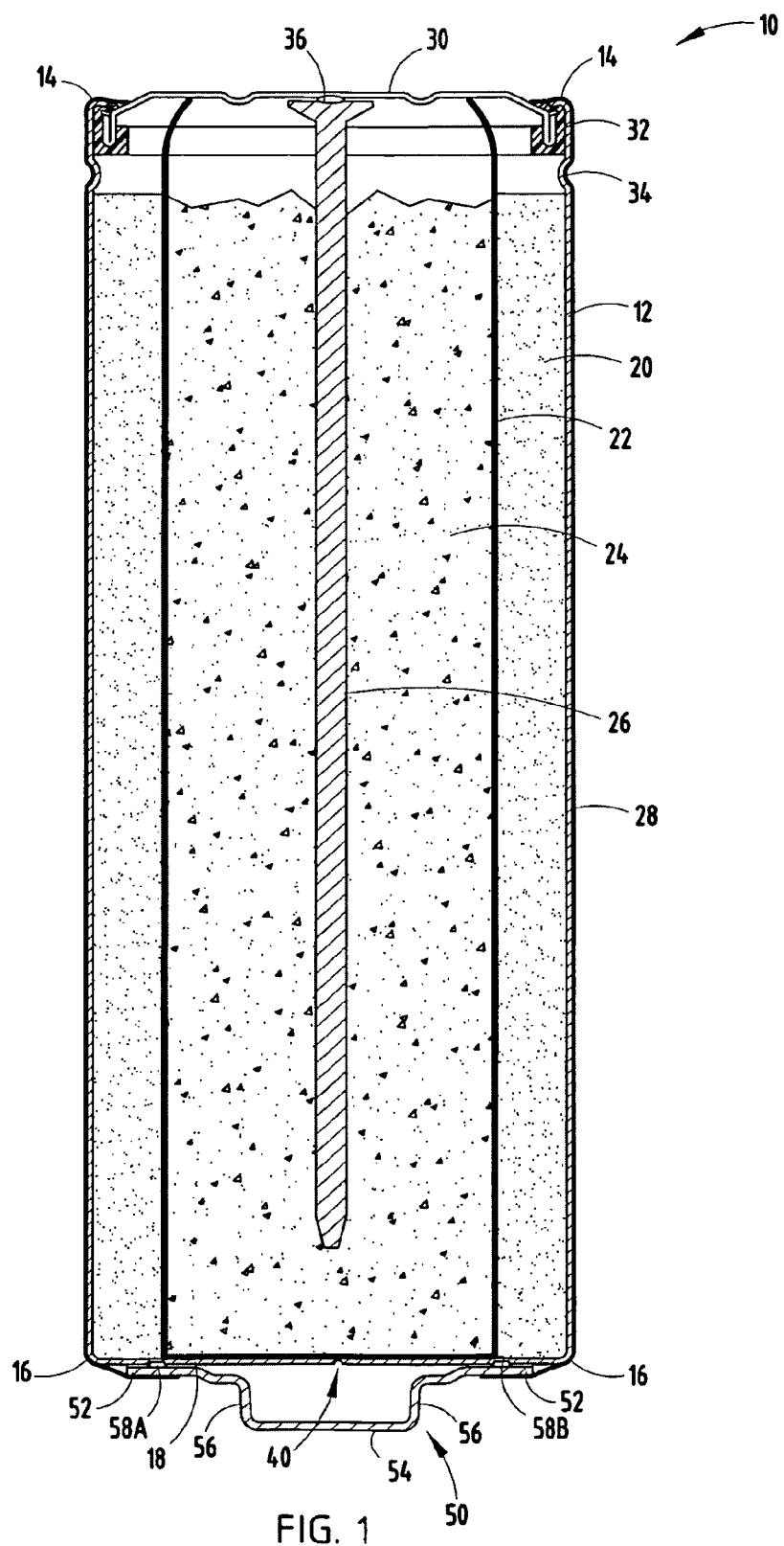
FIG. 1 is a longitudinal cross-sectional view of an electrochemical cell having a pressure relief vent mechanism and contact terminal cover provided on the closed bottom end of the cell can, according to one embodiment of the present invention.

Referring to FIG. 1, a cylindrical alkaline electrochemical cell (battery) 10 is generally shown having a stress concentration pressure relief vent mechanism 40 formed in the closed bottom end wall of the cell can 12 and an overlying outer cover 50 welded to the can bottom end wall, according to one embodiment of the present invention. The pressure relief mechanism 40, formed as a reduced thickness groove, operates as a pressure rupturable vent to vent excessive gas from within the battery cell and, in cooperation with the outer cover 50, provides for the effective release of excessive gases. The electrochemical cell 10 may include a cylindrical alkaline cell, such as an AA-size battery cell, according to one example. It should be appreciated that other shapes and sizes of cells for use in single or multiple cell batteries may employ the vent 40 and cover 50 arrangement according to the teachings of the present invention.

The electrochemical cell 10 includes a container generally shown as a cylindrical steel can 12 having a first or top end 14, a second or bottom end 16, and a cylindrical side wall extending between the top and bottom ends 14 and 16. The second or bottom end 16 of the steel can 12 has a closed end wall 18 integrally formed, in the embodiment shown, during formation of the steel can 12. This may be achieved by a conventional can formation process, such as a deep drawing process. Alternately, the closed end wall 18 may be connected, e.g., welded, to the bottom end 16 of the cylindrical side wall to form can 12.

The can 12 and its closed end wall 18 may be made of any suitable metal that can be formed into a desired shape and can be adapted to seal the contents within the cell 10. In the embodiment shown, the steel can 12 also functions as the cathode current collector, and therefore has good electrical conductivity. The internal surface of the steel can 12 may be coated with a material, such as graphite. The external surface of the steel can 12 may be plated to provide corrosion resistance, high electrical conductivity, and an attractive appearance. According to one embodiment, the interior surface of the steel can 12 may be plated with nickel and cobalt, followed by a diffusion annealing process after electroplating. According to one embodiment, the side wall and closed bottom end wall of steel can 12 may have a thickness in the range of about 0.005 inch to 0.014 inch (0.13 to 0.36 millimeters or 5 to 14 mils). The can side wall and bottom end wall may have the same or different thicknesses.

Welded onto the exterior surface of the closed bottom end wall 18 of steel can 12 is a positive contact terminal or cover 50 that is formed of nickel plated steel. The cover 50 has a protruding nubbin (i.e., protrusion) 54, defined by side wall 56, at its center region, which serves as the positive contact terminal of cell 10. Assembled onto the opposite top end 16 of steel can 12 is a negative contact terminal or cover 30 which forms the negative contact terminal of cell 10. The positive and negative covers 50 and 30 are made of electrically conductive metal and form the respective positive and negative electrical terminals.

A jacket 28 is formed about the exterior surface of steel can 12, and is further formed over the peripheral edge of the closed bottom end wall 18 of can 12. The jacket 28 may include an adhesive layer such as a metalized, plastic film label.

Disposed within the steel can 12 is a cathode 20, also referred to as the positive electrode, which may be formed of a mixture of manganese dioxide ($MnO_2$), graphite, potassium hydroxide (KOH) solution, and additives, according to one embodiment. The cathode 20 may be ring molded by inserting one or more preformed molded rings of cathode mixture into the steel can 12. Alternately, cathode 20 may be impact molded in steel can 12 into the shape of a cylindrical ring against the interior side walls of the can 12. Impact molding involves compacting the cathode mixture within the steel can 12.

A separator 22 is disposed within the steel can 12 against the interior surface of cathode 20. Separator 22 may be formed of a non-woven fabric that prevents migration of solid particles in the cell 10. An anode 24, also referred to as the negative electrode, is also disposed within the steel can 12 inside of the separator 22. An alkaline electrolyte is further disposed within steel can 12 and in contact with each of the cathode 20, separator 22, and anode 24. The anode 24 may be formed of zinc powder, a gelling agent, and additives, according to one embodiment. While a bobbin-type cell construction is shown and described herein, it should be appreciated that the electrochemical cell 10 can otherwise be configured, such as a jellyroll (spiral wound) electrode and separator cell construction.

A collector and seal assembly is assembled onto the first or open end 14 of the steel can 12 for closing the open end 14 of steel can 12. The collector and seal assembly shown includes current collector 26, annular polymeric (e.g., nylon) seal 32, and negative contact terminal 30. Current collector 26, which may include a brass nail having an elongated body and enlarged head, is disposed in contact with anode 24 and negative outer cover 30 via weld 36. The negative outer cover 30 extends across the open end 14 of steel can 12 and engages nylon seal 32. The seal 32 may include a ring-shaped polymeric seal having a generally J-shape cross-section, according to one embodiment. The assembly of the seal 32 may include disposing the seal 32 in the open end 14 of steel can 12 on top of a bead 34 formed radially inward on the side wall of can 12, or alternately in a flared opening of can 12, and crimping the upper end of steel can 12 inwardly and over the outer periphery of the seal 32 and negative cover 30 to compress seal 32 against bead 34. The polymeric seal 32 is thereby compressed between the peripheral edge of negative cover 30 and the upper end wall of steel can 12.

It should be appreciated that the negative cover 30 is electrically insulated from the steel can 12 by way of the intermediate polymeric seal 32. The resulting collector and seal assembly shown provides a low volume closure to the open end 14 of steel can 12. It should further be appreciated that other closure assemblies may be employed to seal closed the open end 14 of steel can 12.

Referring to FIGS. 2-5, the stress concentration pressure relief vent mechanism 40 is formed as a C-shaped reduced thickness groove offset from the center of the closed bottom end wall 18 of steel can 12. The positive cover 50 is welded to the closed end wall 18 and covers the pressure relief vent mechanism 40. The vent mechanism 40 is shown, according to a first embodiment, as a reduced thickness coined groove 42 formed into the outside (exterior) surface of the bottom end wall 18 of the steel can 12 in the general semicircular shape of a C (referred to as a C-shaped groove). The C-shaped groove 42 has first and second terminating ends 44 and 46 and a curved portion 48 extending between the first and second ends 44 and 46. The C-shaped groove 42 extends along a semicircular path through an angular rotation in the range of 180° to 324°, thereby providing an unthinned area directly between terminating ends 44 and 46 which serves as a hinge during a vent rupture. More particularly, the C-shaped groove 42 extends through an angular rotation in the range of 280° to 310°, according to one embodiment. In an AA-sized cell, the hinge formed between terminating ends 44 and 46 has a minimum width of 0.060 inches when the groove 42 extends through an angular rotation of 324°, according to one embodiment. The hinge preferably remains intact and does not break off during a venting operation.

The C-shaped groove 42 is offset from the center of the end metal wall 18 such that the curved portion 48 of the C-shaped reduced thickness groove 42 midway between the terminating ends 46 and 48 is closer to the center of the end metal wall 18 than the first and second ends 44 and 46. According to one embodiment, the C-shaped groove 42 has a center 74 that is offset from the center 70 of the end wall 18 by a distance 78 of greater than 0.01 inches. The center 74 of C-shaped groove 42 is the central point of the circumscribing circle. In one embodiment, the center 74 of the C-shaped groove 42 is offset from the center 70 of the end wall 18 by approximately 0.02 inches. According to another embodiment, the center 74 of C-shaped groove 72 is offset from the center 70 of end wall 18 by approximately 0.04 inches.

The amount of offset distance 78 from center 70 may depend upon the size of the overlying cover 50 and its protruding nubbin 54. The vent mechanism 40 should be offset from cover 50 by a distance 78 such that the vent mechanism 40 is not substantially blocked by the cover 54. It should be appreciated that as the pressure within can 12 increases, the end wall 18 of can 12 bulges and the overlying cover 50 may come into increased contact with the end wall 18. The offset C-shaped vent mechanism 40 advantageously achieves reduced pressure vent for a given can thickness in the groove 42. It should be appreciated that the C-shaped groove 42 is offset sufficient to allow for reduced pressure rupture of the vent mechanism 40, and the amount of offset 78 from center 74 to the center 70 of the end wall 18 may depend upon size, welds and characteristics of the positive cover 50. The reduced thickness groove vent mechanism 40 acts as a pressure relief mechanism for venting pressurized gases when exposed to an excessive pressure differential. The vent mechanism 40 is designed to fracture along the reduced thickness groove 42 upon experiencing excessive pressure.

Figure 2:
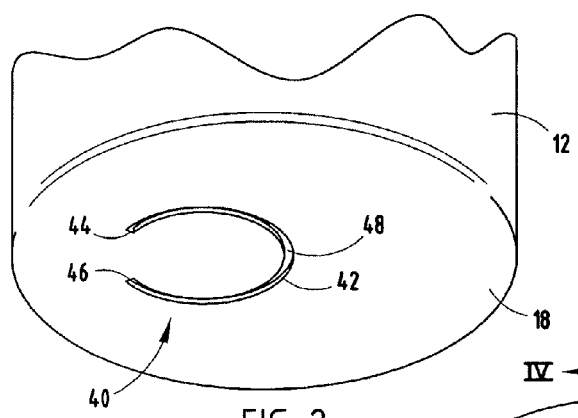
FIG. 2 is a perspective view of the bottom end of the cell can illustrating an offset C-shaped vent mechanism formed in the outside surface of the end wall, according to one embodiment.
Figure 3:
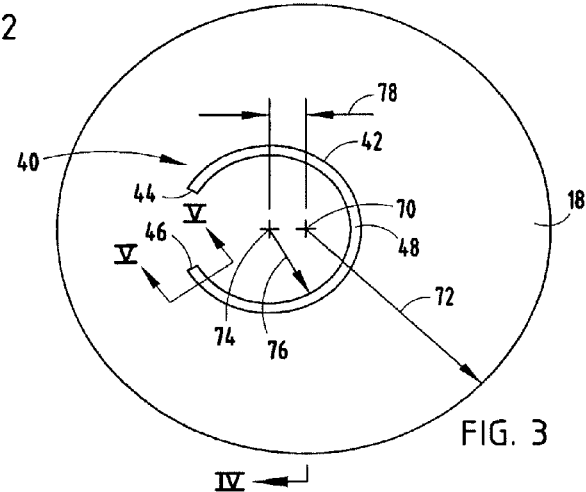
FIG. 3 is a bottom end view of the cell can further showing the offset C-shaped vent mechanism.

As shown in FIGS. 2 and 3, the amount of offset distance 78 from the center 70 of the end metal wall 18 is such that the groove 42 midway between the ends 46 and 48 is on one side of the center 70 of the end metal wall 18. However, other embodiments are contemplated in which the C-shaped groove 42 is positioned such that it crosses the center 70 of the end metal wall 18 or such that the entire C-shaped groove 42 is disposed to one side of the center 70.

Although the C-shaped groove 42 is shown in FIGS. 2 and 3 as having a semi-circular shape, the C-shaped groove can alternatively have a distorted semi-circular shape, such as a semi-oval for example. In such embodiments, the C-shaped groove will be offset such that the midpoint of the groove, located on the groove midway between its two ends, is closer to the center 70 of the end metal wall 18 than it is to the outermost periphery of the end wall 18. As used herein, the outermost periphery of the end wall 18 does not include the bottom end 16 (e.g. a rounded corner as shown in FIG. 4) of the can side wall).

The end wall 18 of can 12 is shown having a radius 72. Additionally, the C-shaped vent mechanism 40 is shown having a radius 76. In one example, the radius 72 of end wall 18 is approximately 0.273 inches for an AA-sized electrochemical cell. The radius 76 of vent mechanism 40 is approximately 0.102 inches, according to this one example. According to one embodiment, the offset distance 78 is greater than 0.01 inches, and according to other embodiments the offset distance 78 may be 0.02 to 0.04 inches.

In the embodiment shown, the reduced thickness groove 42 of vent mechanism 40 is illustrated formed in the outside surface of the bottom end wall 18 of steel can 12. The reduced thickness groove 42 of vent mechanism 40 can be formed by any suitable method for producing reduced thickness grooves in metal plates. Suitable methods include stamping, casting, forging, rolling, cutting, grinding, laser scribing and chemical etching. According to one embodiment, the reduced thickness groove 42 of vent mechanism 40 is formed by a stamping method, such as coining. It should be appreciated that the reduced thickness groove 42 of vent mechanism 40 can be formed either during the can/end wall manufacturing process, or as a separate process. In the coining vent formation embodiment, force is applied to the metal end wall 18, located between a punch and a die, in which either or both of the punch and die can include projections which causes the metal of can 12 to flow into the desired shape.

Figure 4:
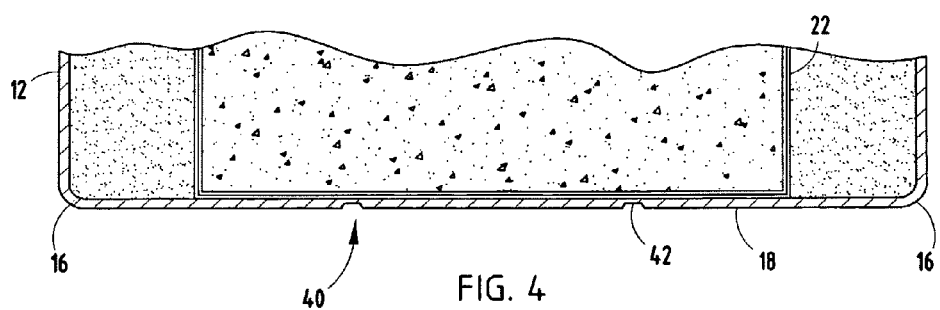
FIG. 4 is an enlarged cross-sectional view of the bottom portion of the cell taken through line IV-IV of FIG. 3, further illustrating the reduced thickness groove vent mechanism.
Figure 5:
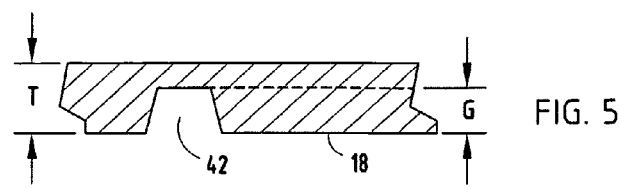
FIG. 5 is an enlarged cross-sectional view of the cell can taken through line V-V- of FIG. 3 further illustrating the reduced thickness groove vent mechanism.

The reduced thickness groove 42 of vent mechanism 40 shown in FIGS. 4 and 5 extends into the bottom end wall 18 of steel can 12 by a depth G. The unthinned bottom end wall 18 of steel can 12 has a thickness T, typically in the range of 5 to 15 mils (0.005-0.015 inches), and more specifically about 6 to 10 mils. The vent mechanism 40 therefore has a metal thickness equal to the difference between the total can thickness T and groove depth G. In one embodiment, the reduced thickness groove 42 of vent mechanism 40 may be formed to a depth G of approximately 5.8 mils in steel can 12 having a thickness T of approximately 8.3 mils, leaving approximately 2.5 mils of unthinned can at the vent mechanism 40. The vent mechanism 40 allows for an unthinned can thickness of greater than 2.0 mils, and more particularly of about 2.5 mils to provide an expected vent rupture pressure of about 900 psi, according to one example of an AA-size alkaline electrochemical cell.

According to one example, the electrochemical cell 10 is an AA-size cell employing a low carbon, aluminum killed, SAE 1006 or equivalent steel with an inside can plating of nickel and cobalt, and an outside plating of nickel. The steel substrate comprises maximums of 0.08 weight percent carbon, 0.45 weight percent manganese, 0.025 weight percent phosphorous and 0.02 weight percent sulfur; and the grain size of the steel is ASTM 8 to 12. The steel strip may have the following mechanical properties: 45,000 pound maximum yield strength, 60,000 pound ultimate strength, 25 percent minimum elongation in 2 inches (50.8 mm), and 82 maximum Rockwell 15 T hardness. The can 12 has a manufactured overall height of approximately 1.3 inches, and an outside diameter of approximately 0.549 inches. The C-shaped vent mechanism 40 is located in the closed end wall 18 of can 12 and is bounded by a circumscribing circle having a diameter of approximately 0.204 inches.

The reduced thickness groove vent mechanism 40 is shown formed with a substantially trapezoidal shape coined groove 42. In one example, coined groove 42 has side walls angled at approximately 68° relative to each other, and a substantially flat bottom. The substantially flat bottom of the coined groove 42 has a width of approximately 4 mils, as compared to the widest overall width of vent mechanism 40 of approximately 11.4 mils.

It should be appreciated that the material and thickness of the can 12, as well as the shape and size of the reduced thickness groove vent mechanism 40 may be selected based on various requirements, such as the cell electrochemistry, size and method of closing and sealing the can 12. It should further be appreciated that the intended pressure at which the pressure relief vent mechanism 40 is expected to open may also determine the size and shape of the reduced thickness groove 42 to meet the needs of a particular battery cell.

When the vent mechanism 40 is formed in the bottom end wall 18 of steel can 12, the can 12 may bulge outward and have rounded corners. The steel can 12 may be reshaped during insertion of the cathode 20, such as during a cathode impact molding procedure, so as to form a substantially flat bottom end wall 18 of can 12. The cathode 20 may be formed by a ring molding process of inserting one or more cathode rings. Alternately, the cathode 20 may be formed by impact molding. The C-shaped groove 42 of vent mechanism 40 may be formed in the inside surface of the end wall 18. By forming the vent mechanism 40 in the inside surface of end wall 18, impact molding of the cathode 20 may reduce the possibility of damage to the vent mechanism 40 due to inversion of the coined vent groove. Additionally, forming of the coined groove on the interior surface has the added advantage of minimizing disturbance of the exterior can surface, which could be prone to rusting in humid or corrosive environments if the nickel plated surface layer is damaged.

The C-shaped groove 42 of vent mechanism 40 may be formed in either or both the inside or outside surface of end wall 18 and is sized to rupture at a predetermined pressure. In the exemplary embodiment shown, the vent mechanism 40 is a C-shaped groove 42 that is offset from the center 70 of end wall 18 such that the terminating ends 44 and 46 of the C-shaped groove 42 are located away from the center 70 of the end wall 18. In this embodiment, the midpoint 48 of the curved groove 42 between the terminating ends 44 and 46 of groove 42 is nearer to the center 70 of the bottom end wall 18 of can 12 than terminating ends 44 and 46.

It should be appreciated that other size and offset configurations of the C-shaped groove vent mechanism 40 may be employed in the bottom end wall 18 of can 12. It should further be appreciated that the offset C-shaped vent mechanism 40 may be formed in either the interior surface of end wall 18 and/or the exterior surface of end wall 18. However, it should be appreciated that the formation of the vent mechanism 40 in the interior surface of end wall 18 of steel can 12 may allow for use of a thinner can and/or greater groove depth G because the can 12 is more resistant to damage to the coined region due to inversion by forces during impact molding of the cathode 20.

The positive contact terminal 50 is welded onto the bottom end wall 18 of steel can 12, such that positive contact terminal 50 covers the pressure relief vent mechanism 40. Thus, contact terminal 50 also acts as a cover that prevents the electrochemical materials (e.g., gas and/or liquid) from spraying directly outward from the cell 10 upon rupture of vent mechanism 40. The positive contact terminal 50 is substantially centered on the bottom end wall 18 and is sized such that the vent mechanism 40 is substantially located under protruding nubbin 54. The protruding nubbin 54 of positive terminal 50 has a diameter and height sufficient to allow the vent mechanism 40 to rupture with minimal interference during a venting operation to sufficiently allow for release of excessive pressurized gases and/or liquid from within cell 10.

Figure 6:
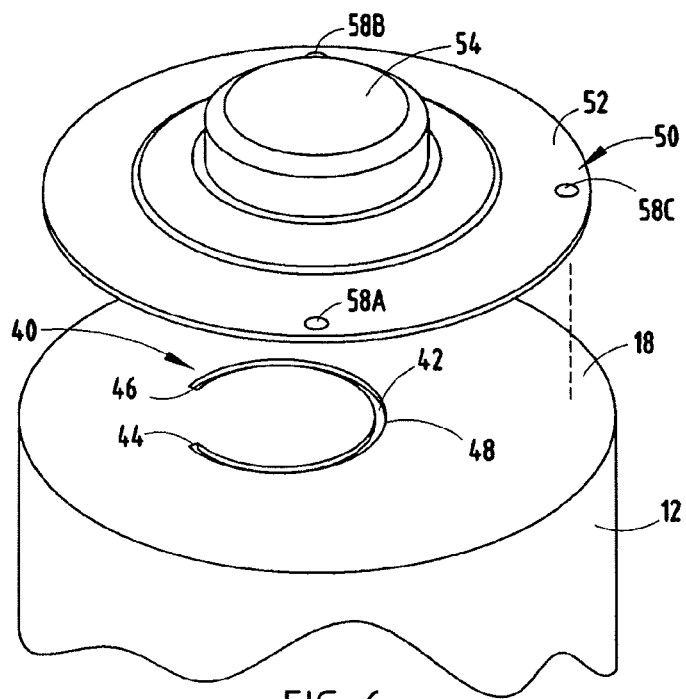
FIG. 6 is an exploded perspective view of the bottom end of the cell illustrating the cover contact terminal welded onto the end wall of the can having the offset C-shaped vent mechanism.
Figure 7:
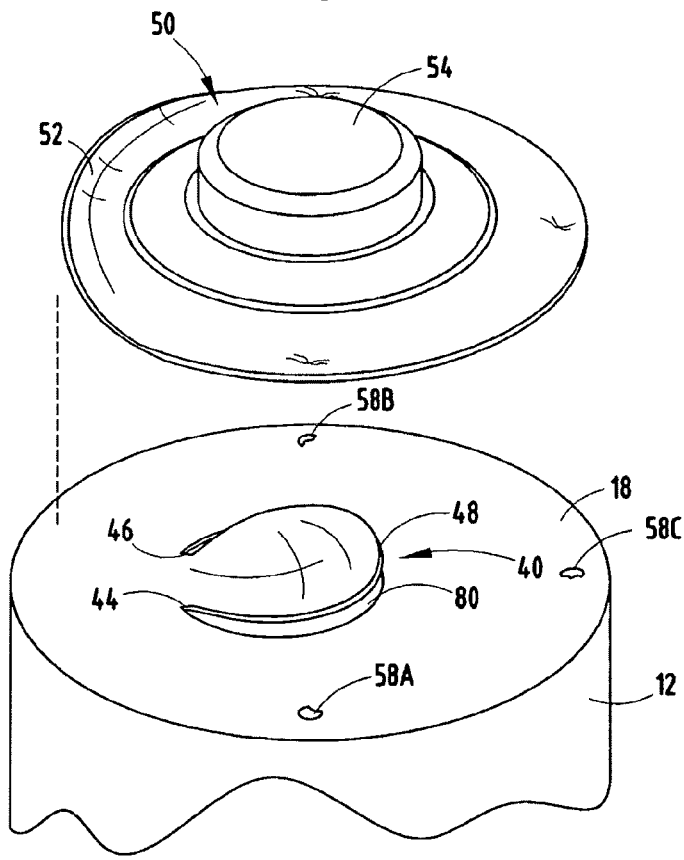
FIG. 7 is an exploded perspective view of the bottom end of the battery illustrating vent rupture and deformation of the cover contact terminal peripheral flange between adjacent welds during a venting operation.

Referring to FIGS. 6 and 7, the positive cover 50 is shown connected to the closed end wall 18 of steel can 12 via three asymmetrically located welds 58A, 58B and 58C that are specifically located to allow controlled release of the vented gases to the outside atmosphere. In the embodiment shown, welds 58A, 58B and 58C are asymmetric in that they are not spaced at equal angles relative to each other. Instead, first and second welds 58A and 58B are angularly spaced apart by an angle of about 180°. Second and third welds 58B and 58C are angularly spaced apart by an angle equal to about 90°, and third and first welds 58C and 58A are also angularly spaced apart by an angle of about 90°. The spacing between adjacent welds 58A and 58B is at an angle greater than 120°, and more specifically at an angle between 120° and 240°, and yet more specifically at an angle in the range of 160° to 180°. The angles between weld are measured from the center point of welds 58A, 58B and 58C. The increased angle between welds 58A and 58B reduces the amount of support or constraint provided by the cover 50, such that the vent pressure observed using covers with the increased weld spacing is reduced relative to the vent pressure observed when equally spaced welds are used.

The peripheral flange 52 of positive cover 50 is shown having a diameter slightly less than the diameter of the end wall 18 of steel can 12. The welds 58A, 58B and 58C are formed near the outer perimeter of peripheral flange 52. According to the AA-size electrochemical cell example described herein, the nubbin 54 has a height of approximately 0.078 inches, and a diameter of approximately 0.210 inches. In this example, the welds 58A, 58B and 58C are located approximately 0.24 inches from the center of the closed end wall 18 of can 12 which has an outside diameter of about 0.54 inches. It should be appreciated that the positive cover 50 has its peripheral flange 52 and protruding nubbin 54 sized to allow for proper venting of the steel can 12, even as the bottom end wall 18 of steel can 12 bulges due to pressure buildup within the can 12.

The peripheral flange 52 of positive cover 50 is made of an electrically conductive material and has a thickness selected to allow the flange 52 to flex during a proper venting operation. As such, the peripheral flange 52 may flex upward when subjected to sufficient pressurized gas and/or liquid underneath the positive cover 50. It should be appreciated that by spacing the welds 58A and 58B at an angle greater than 120°, or more specifically, at an angle between 120° and 240°, or yet more specifically at an angle in the range of 160° to 180°, the peripheral flange 52 of positive cover 50 is able to flex more easily between adjacent welds 58A and 58B to allow for vented gases exiting vent mechanism 40 to pass to the outside environment.

The welds 58A-58C may include conventional spot welds formed by laser or resistive weld techniques, as examples. However, it should be appreciated that other weld materials may be employed to connect the peripheral flange 52 of the outer cover 50 to the outside surface of the bottom end wall 18 of steel can 12. In other embodiments, the weld separation angles may vary and may be spaced apart evenly. It should further be appreciated that more than three welds may be employed. By employing at least three welds, the cover 50 is connected to the bottom end wall 18 of steel can 12 at connection points that define a plane that maintains the cover 50 onto the bottom end wall 18, while allowing a portion of the peripheral flange 52 extending between welds 58A and 58B to flex and allow for the release of the venting gases and/or liquid during a venting operation.

The bottom end wall 18 of steel can 12 is further shown in FIG. 7 with the vent mechanism 40 ruptured along opening 80 following a venting operation. The vent mechanism 40 is shown ruptured along the groove 42 such that the unthinned area between terminating ends 44 and 46 forms a hinge. Prior to the vent operation, the closed end wall 18 of can 12 will bulge outward as pressure within the can 12 increases and, upon reaching the predetermined vent pressure, the vent mechanism 40 will rupture along groove 42 and release the pressurized gases and/or liquid. Upon rupture, the pressurized gases and/or liquid will exit the can 12 and pass between the peripheral flange 52 of cover 50 and the end wall 18 of can 12 in a region between adjacent welds. Alternately, the positive cover 50 may be welded onto end wall 18 via three welds at equal distances of 120° apart from each other, or any other number of welds may be employed.

Accordingly, the electrochemical cell 10 of the present invention advantageously achieves enhanced and effective venting of gases and/or liquid upon reaching an excessive pressure limit. The cell 10 employs the vent mechanism and outer cover 50 such as to provide effective venting in a manner that minimizes the chance of inhibiting proper venting of gases when excessive pressure is experienced within the cell 10.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container having a first end, a second end, a side wall extending between the first and second ends, and an end metal wall extending across the first end;
   a positive electrode disposed in said container;
   a negative electrode disposed in said container;
   an aqueous alkaline electrolyte disposed in said container;
   a groove formed in the end metal wall of said container, said groove having first and second terminating ends and a curved portion there between, wherein a middle portion of the groove is closer to a center of the end metal wall than the first and second ends and the first and second ends are away from a periphery of the end metal wall;
   a hinge of unthinned material defined between the first and second ends of the groove; and
   a positive cover coupled to the end metal wall, the positive cover covers the groove and includes a protruding nubbin.

2. The electrochemical cell as defined in claim 1, wherein the nubbin covers the groove.

3. The electrochemical cell as defined in claim 1, wherein the container comprises a nickel plated steel can.

4. The electrochemical cell as defined in claim 1, wherein said groove is formed in the outside surface of the end metal wall of the container.

5. The electrochemical cell as defined in claim 1, wherein said groove is formed in the inside surface of the end metal wall of the container.

6. The electrochemical cell as defined in claim 1, wherein the positive electrode comprises manganese dioxide and the negative electrode comprises zinc.

7. The electrochemical cell as defined in claim 1, wherein groove is offset from the center of the end wall by a distance greater than 0.01 inches.

8. The electrochemical cell as defined in claim 1, wherein the groove is offset from the center of the end wall by at least 0.02 inches.

9. The electrochemical cell as defined in claim 8, wherein the C-shaped reduced thickness groove is offset from the center of the end wall by about 0.04 inches.

10. The electrochemical cell as defined in claim 1, wherein said reduced thickness groove extends in a semicircle through an angle in the range of 180° to 324°.

11. The electrochemical cell as defined in claim 10, wherein the reduced thickness groove extends in a semicircle through an angle in the range of 280° to 310°.

12. The electrochemical cell as defined in claim 1, wherein the container is substantially cylindrical.

13. The electrochemical cell as defined in claim 1, wherein the curved portion of the groove midway between the ends is on one side of the center of the end metal wall and the ends of the groove are on an opposite side of the center of the end metal wall.

14. The electrochemical cell as defined in claim 1, wherein the curved portion of the groove midway between the ends and the ends of the groove are on the same side of the center of the end metal wall.

15. The electrochemical cell as defined in claim 1, wherein the curved portion of the groove midway between the ends is at the center of the end metal wall.

16. The electrochemical cell as defined in claim 1 the positive cover being welded onto the end wall of the container via at least three welds, wherein the angular spacing between two adjacent welds is greater than 120°.

17. The electrochemical cell as defined in claim 1, the groove being offset a distance selected to allow for reduced pressure rupture of the groove.

18. The electrochemical cell as defined in claim 1, the groove having a semi-oval shape.

19. The electrochemical cell as defined in claim 1, wherein the groove is formed away from a peripheral transition between the end wall and the side wall of the container.

20. An electrochemical cell comprising:
a container having a first end, a second end, a side wall extending between the first and second ends, and an end metal wall extending across the first end;
a positive electrode disposed in said container;
a negative electrode disposed in said container;
an aqueous alkaline electrolyte disposed in said container;
a groove formed in the end metal wall of said container, said groove having first and second terminating ends and a curved portion there between, wherein a middle portion of the groove is closer to a center of the end metal wall than the first and second ends;
a hinge of unthinned material defined between the first and second ends of the groove; and
a positive cover coupled to the end metal wall, the positive cover covers the groove and includes a protruding nubbin, wherein the curved portion of the groove midway between the ends is on one side of the center of the end metal wall and the ends of the groove are on an opposite side of the center of the end metal wall.

* * * * *